Figures 1, 2:
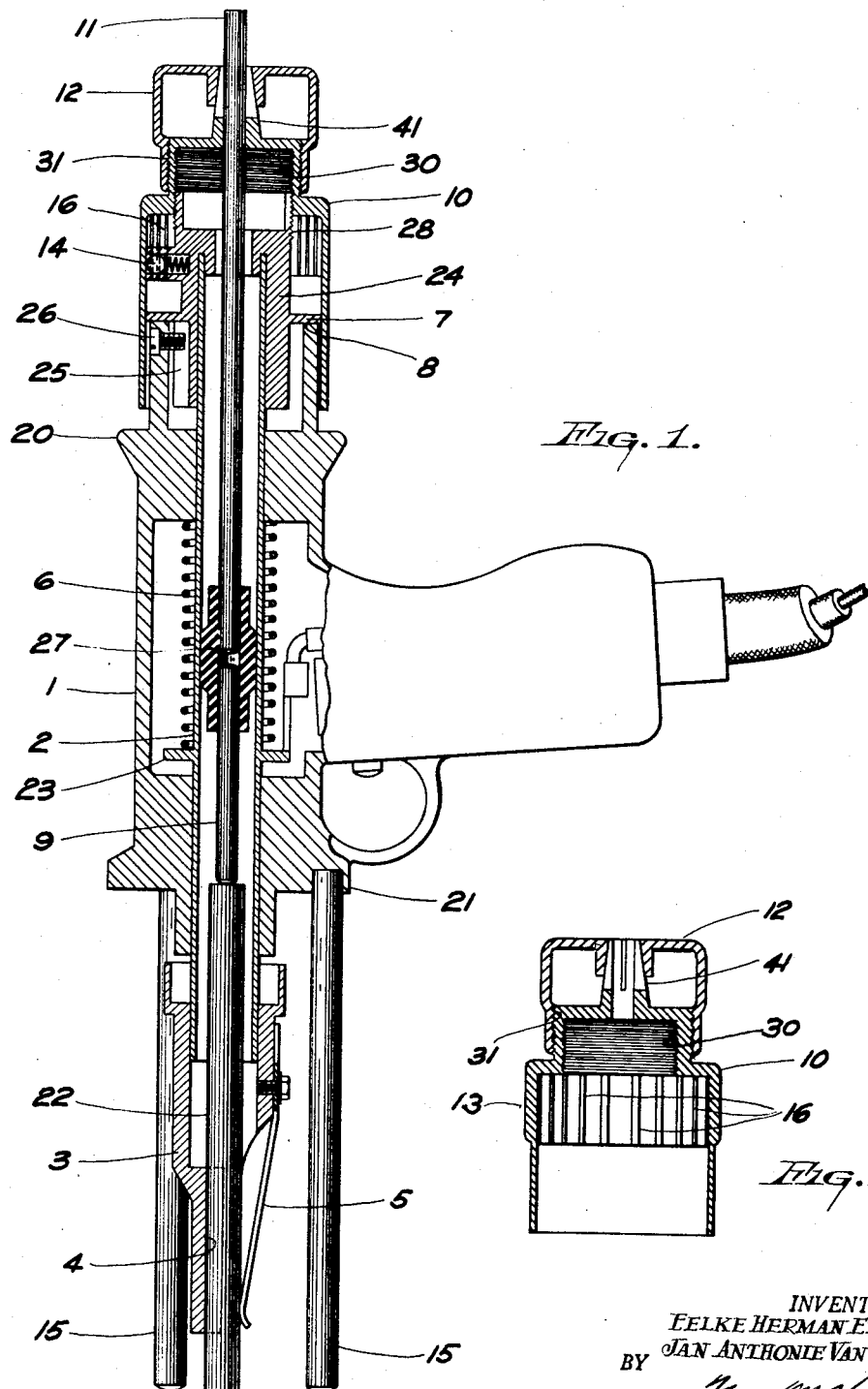

Sept. 8, 1959  E. H. ETTEMA ET AL  2,903,563
STUD-WELDING GUN
Filed April 18, 1956

INVENTORS.
EELKE HERMAN ETTEMA
JAN ANTHONIE VAN BERGEN
BY
Fred M Vogel
AGENT

United States Patent Office 2,903,563
Patented Sept. 8, 1959

2,903,563

STUD-WELDING GUN

Eelke Herman Ettema, Utrecht, and Jan Anthonie van Bergen, Eindhoven, Netherlands, assignors, by mesne assignments, to North American Philips Company, Inc., New York, N.Y., a corporation of Delaware Application April 18, 1956, Serial No. 579,075

Claims priority, application Netherlands April 18, 1955

3 Claims. (Cl. 219—98)

This invention relates to stud-welding guns having a part which is movable relatively to the frame of the gun and provided with a stud-holder which permits a stud clamped therein to be moved towards a workpiece to which the stud is to be secured.

A stud-welding gun similar to the one described herein is disclosed in our co-pending U.S. patent application, Serial No. 579,076 filed April 18, 1956, now Patent 2,892,069.

With present-day stud-welding methods it is possible to satisfactorily weld studs of different diameters and lengths. In order to weld studs of different lengths it has been proposed to use a stud-welding gun which is supported from a workpiece by means of supports which may be adjustable relative to the frame of the gun. In such guns the distance between the workpiece and the stud end to be welded is variable. Due to the fact that the supports are adjustably secured to the frame, such guns have the disadvantage that the gun may be displaced relative to the workpiece, and thus cause the stud to be improperly welded in position.

Furthermore, stud welding guns are known which comprise, besides adjustable supports for coarse control, an adjustable lug in the stud holder. This lug is directly secured to the stud holder by means of a bolt. Due to the supports the bolt is inaccessible and the adjustment of the lug requires an intricate and time-consuming manipulation by the welder.

In accordance with the invention, the movable part of the gun comprises a central pin or positioning member acting as a stop for a stud, which pin is adjustable relatively to the movable part.

One advantage of the invention is that the supports are fixedly secured to the frame of the gun, and since the pin acts as a stop the attachment of the pin to the movable part may be made such as to be easily accessible.

In using the gun according to the invention a stud is inserted into the holder with one end in contact with the pin or positioning member, which member is then adjusted so that the end of the stud to be welded lies in the plane of the free ends of the supports. The positioning member is then secured in position whereupon the gun is ready for use.

According to a further feature of the invention the movable part comprises clamping means such as a chuck for the pin, which chuck can be tightened by means of a nut secured to it. This permits a simple adjustable attachment of the pin to the movable part without the need of special tools.

Mounting the stud in such a manner that the end to be welded lies exactly in the plane of the free ends of the supports is extremely simple for the welder, but this position is not always optimum for the welding operation. The electric arc causes the end to fuse so that a satisfactory contact is not established between the workpiece and the stud when moving the stud towards the workpiece. Therefore, it may be desirable that the stud extends beyond the plane passing through the free ends of the supports.

For many uses it is necessary that, after the welding operation, all the upper ends of the welded studs should be at the same level. If the studs do not fuse evenly not all of them would be pressed to the same level into the weld, unless this movement is limited. Therefore, according to a further feature of the invention, the chuck is secured as a nut to the movable part to permit adjustment of the pin relative to the movable part after tightening of the chuck. After providing the stud in the aforesaid manner, accurate after-adjustment is thus possible by tightening the chuck like a nut, so that the distance over which the stud can be pressed into the molten mass of the workpiece is accurately determined.

Since the aforesaid distance should be accurately adjustable, for example to approximately 0.1 mm. regularly divided arresting positions are provided between the chuck acting as a nut and the movable part. Displacement of the nut from one arresting position to the next may then correspond, for example, to a displacement of the stud by 0.1 mm. to permit the welder accurately to determine said adjustment in steps of 0.1 mm. by means of the arresting positions.

In order that the invention may be readily carried into effect it will now be described in detail with reference to the accompanying drawings in which;

Figure 1 is a side view partly in section of a stud welding gun according to the invention, and Fig. 2 is a sectional view of certain of the parts of the gun shown in Figure 1.

The stud welding gun illustrated in the drawing comprises a hollow frame 1 having a handle portion and end portions 20 and 21 which slideably support a metal tube 2 so that it is movable in an axial direction. Fixedly secured to the lower end of tube 2 is a stud holder 3 having a grooved lower portion 4 in which a stud 22 to be welded is removably held in place by a leaf spring 5. Tube 2 is provided with an annular portion 23 which is engaged by one end of a compression spring 6 whose other end bears against portion 20 of frame 1 to thereby force tube 2 and stud holder 3, as well as stud 22, toward the work piece (not shown). Secured to the lower end of frame portion 21 are three supports 15 (only two being shown) adopted to support the gun on the work piece.

Fixedly secured to the upper end of tube 2 is a member 24 having an annular portion 7 which is adapted to engage the upper surface of frame portion 20 to thereby limit the movement of tube 2, stud holder 3, and stud 22 in a direction toward the work piece. Member 24 is also provided with an axially-extending groove 25 which is engaged by a screw 26 secured to the frame portion 20 to thereby prevent rotation of member 24, as well as tube 2 and stud holder 3, while at the same time permitting axial displacement thereof. Member 24 is also provided with a spring-biased ball 14 for a purpose to later be discussed. Arranged within tube 2 are two metal rods 9 and 11 whose adjacent ends are interconnected by a coupling 27 of insulating material.

Member 24 has an annular portion 28 provided with external screw threads which are engaged by internal threads 30 of an adjusting nut 10. As shown more clearly in Figure 2, adjusting nut 10 has a cup-shaped portion 13 provided on its inner surface with a plurality of axially-extending grooves 16 which are engaged by the spring-biased ball 14, see Figure 1. Adjusting nut 10 has an upper cone-shaped portion 41 which is slotted to form a clutch by which rod 11 may be fixedly secured to nut 10. Clutch 41 may be tightened or loosened by means of nut 12 whose lower end is provided with screw threads engaging threads 31 on the outer surface of nut 10.

In welding with the gun, the stud 22 is positioned in stud holder 3, and the gun is placed upon the surface of a work piece with the supports 15 in contact therewith. Nut 12 is then loosened, whereupon the assembly comprising rod 11, coupling 27, and rod 9 is moved downward until the lower end of rod 9 engages the upper end of stud 22 and the lower end of stud 22 is in contact with the surface of the work piece. Nut 12 is then tightened to fix rod 11 with respect to member 10. Member 10 is then rotated whereby stud 22 is moved axially so that it will extend the desired distance beyond the ends of supports 15.

A suitable stud welding ferrule is then provided on the free end of stud 22, whereupon the gun is arranged with the ends of supports 15 in contact with the work piece and with the stud 22, and associated movable structure, displaced axially against the pressure of spring 6 a distance which is equal to the sum of the distance with which the stud extended beyond the ends of supports 15 and the distance the ferrule extended beyond the end of stud 15. The welding current is then switched on and, as the welding proceeds the ferrule collapses, whereby stud 15 is moved through the above-mentioned distance by the action of spring 6.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A stud-welding gun comprising a frame having a portion adapted to be positioned on a member to which a stud is to be secured, a supporting member slideably mounted on said frame and including means to adjustably support a stud, resilient means urging said supporting member toward said frame portion, means limiting the travel of said supporting member toward said frame portion, a positioning member movably mounted on said supporting member and adapted to position stud therein, adjusting means to adjust the location of said positioning member with respect to said supporting member, and clamping means for selectively securing said positioning member to said adjusting means.

2. A stud-welding gun comprising a frame having a portion adapted to rest upon a member to which a stud is to be secured and a threaded portion, a supporting member slideably mounted on said frame and including means to adjustably support a stud, means to prevent rotation of said supporting member, a spring urging said supporting member toward said frame portion, means limiting the travel of said member toward said frame portion, a positioning member movably mounted on said supporting member and adapted to engage one end of the stud, an adjusting member having threads engaging said threaded portion, a clamp associated with said positioning member and secured to said adjusting member, and a member for actuating said clamp.

3. A stud-welding gun comprising a frame provided with a bore and having a threaded portion and a positioning portion adapted to engage a member to which a stud is to be secured, a supporting member having a tubular portion slideably mounted in said bore and including means to adjustably support a stud, a compression spring urging said supporting member toward said positioning portion, a stop limiting the travel of said member toward said positioning portion, means to prevent rotation of said tubular member with respect to said frame, a rod movably mounted within said tubular member and adapted to engage one end of the stud, an adjusting nut having threads engaging said threaded portion, a clamp for said rod and secured to said nut, and a second nut for actuating said clamp.

References Cited in the file of this patent

FOREIGN PATENTS

| | | |
|---|---|---|
| 476,420 | Italy | Dec. 10, 1952 |
| 812,331 | Germany | Aug. 27, 1951 |